United States Patent [19]

Strahsner et al.

[11] 4,152,126
[45] May 1, 1979

[54] EQUIPMENT FOR REMOVING DUST PARTICLES FROM AN AIR STREAM

[75] Inventors: Emanuel Strahsner; Siegfried Sigott, both of Zeltweg, Austria

[73] Assignee: Vereinigte Osterreichische Eisen- und Stahlwerke-Alpine Montan Aktiengesellschaft, Vienna, Austria

[21] Appl. No.: 813,614

[22] Filed: Jul. 6, 1977

[30] Foreign Application Priority Data

Aug. 11, 1976 [AT] Austria ................................ 5971/76
Nov. 12, 1976 [AT] Austria ................................ 8431/76

[51] Int. Cl.$^2$ ............................................ B01D 47/10
[52] U.S. Cl. ...................................... 55/228; 55/222; 55/229; 55/238; 55/276; 55/385 D; 261/DIG. 54; 210/521; 98/50
[58] Field of Search ................... 55/227–229, 55/222, 238, 257 R, 257 C, 276, 385 D, 421, DIG. 21; 261/DIG. 54, 2, 3; 210/513, 521; 98/50

[56] References Cited

FOREIGN PATENT DOCUMENTS 517209 2/1953 France .......................... 55/238
379838 9/1932 United Kingdom ............ 261/DIG. 54
727704 4/1955 United Kingdom ............ 261/DIG. 54

Primary Examiner—Frank W. Lutter
Assistant Examiner—David L. Lacey
Attorney, Agent, or Firm—Cushman, Darby & Cushman

[57] ABSTRACT

Apparatus for removing dust particles from an air stream includes a tubular housing having an inlet end and an outlet end; a plurality of Venturi tubes having open inflow ends and open outflow ends supported side-by-side within the housing, with their axes parallel to the housing axis so that their inflow ends receive air flowing into the inlet end of said housing; a nozzle for spraying water into the air entering each of the Venturi tubes whereby dust particles in the air are collected in the water and whereby sludge-containing water and air are discharged through the outflow ends of said Venturi tubes; a tank which surrounds said tubular housing, the tank having an outer wall surrounding and spaced from the tubular housing and partition means in the space between said outer wall and the tubular housing dividing the space into first and second compartments; a sludge separator in communication with the outflow ends of the Venturi tubes; conduit means connected to the sludge separator for supplying sludge-containing water from the separator to the first compartment; a sludge outlet for the first compartment; a conduit for conveying essentially sludge-free water from the first compartment to said second compartment; a freshwater supply connected to the second compartment; and a nozzle-supply conduit connecting the second compartment with the nozzle for supplying water thereto.

16 Claims, 8 Drawing Figures

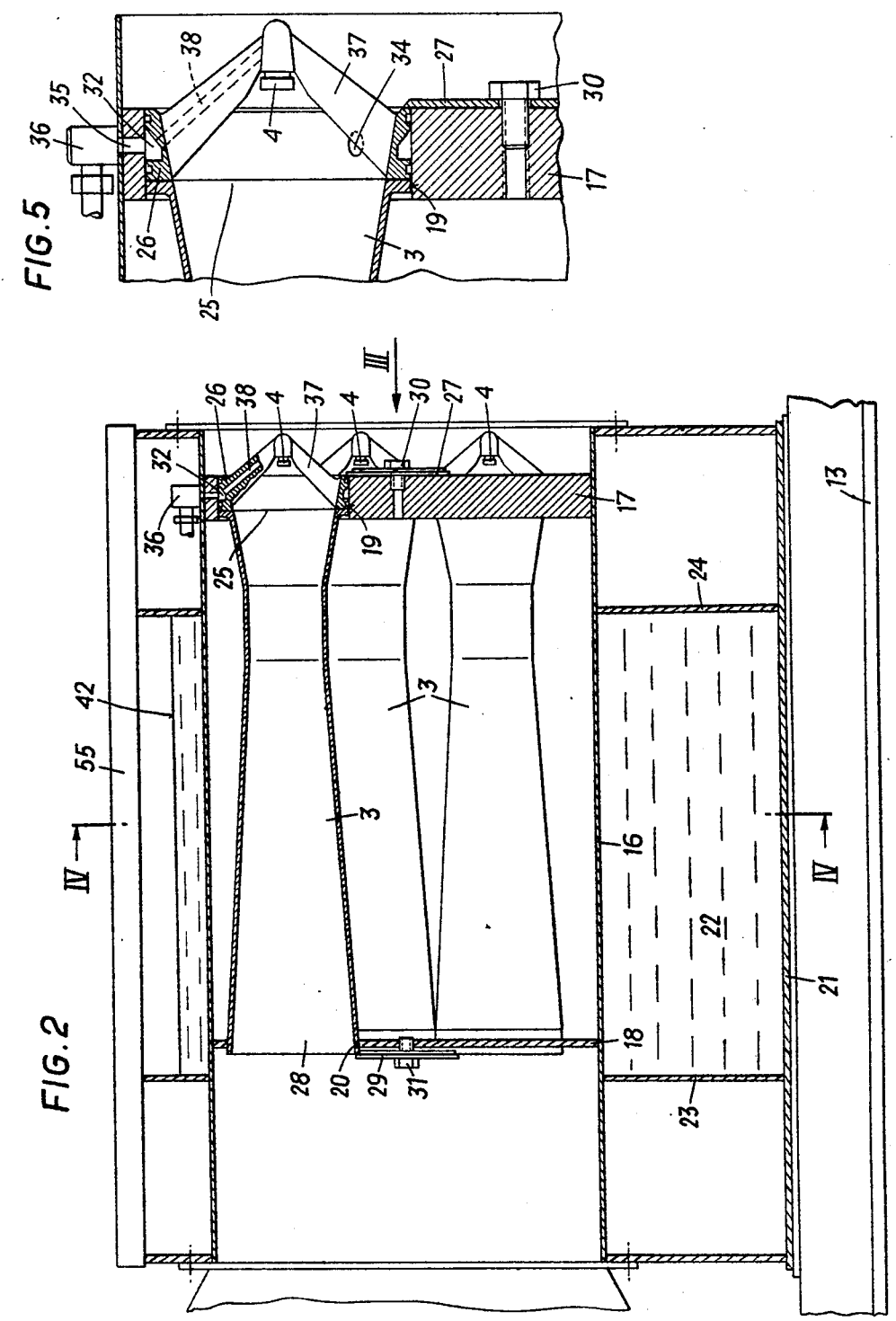

EQUIPMENT FOR REMOVING DUST PARTICLES FROM AN AIR STREAM

This invention relates to equipment for removing dust particles from an air stream, particularly for the ventilation of mines, in which the dust-laden air to be fed to a separator is forced by a blower through a Venturi tube and water is added through a nozzle to the air as it flows through the Venturi tube. Such equipment is used, e.g. in mines to remove dust from dust-laden air in conjunction with the use of tunnel-driving machines and other kinds of machines. Whereas the use of Venturi tubes has proved suitable, such Venturi tubes generate a strong noise, which is extremely inconvenient for those who work in the mine. The generation of noise is not only a heavy strain on the persons working in the mine but also involves an accident risk because a worker's attention is detracted by the noise that is generated.

It is an object of the invention to avoid these disadvantages. The invention resides essentially in that a plurality of Venturi tubes are connected in parallel and inserted in a tubular housing, which is at least partly jacketed by a water tank for holding the water to be supplied to the nozzles. As a result of the provision of a plurality of Venturi tubes, which are connected in parallel, the air rate, and with the air rate also the efficiency of the apparatus, are increased, but the generation of noise is increased, too. The noise is substantially decreased by the water jacket which surrounds the Venturi tubes. The arrangement of the Venturi tubes in a tubular housing, which is jacketed by the water tank, results in a greatly simplified structure and in a desirable shape of the water tank. In a preferred embodiment of the invention, the arrangement is preferably such that its two tube plates are inserted in the tubular housing and extend at right angles to the axis of the latter and these tube plates have receiving bores, in which the two ends of the Venturi tubes are inserted, so that the Venturi tubes are rigidly held in the tubular housing. The space which is provided in the tubular housing between the two tube plates is filled with air so that the Venturi tubes are enclosed by an air jacket and the latter is surrounded by the water jacket. The use of that air jacket in conjunction with the water jacket results in an optimum noise damping.

In accordance with the invention the receiving bores in the tube plates are suitably arranged in a circle that is centered on the axis of the tubular housing, and a central plate is screw-connected to each tube plate and overlaps the edges of the Venturi tubes. This results in a simple structure. The tube plates are suitably welded to the tubular housing. The central plates ensure a firm fixation of each Venturi tube to the tube plates and the tubular housing. This fixation contributes also to the reduction of noise, and because these central plates are screw-connected to the tube plate and Venturi tubes can easily be removed from the mine holding them.

In accordance with the invention the arrangement is suitably such that each receiving bore of the tube plate which is disposed at the inflow end of the Venturi tubes contains a ring, which carries at least one nozzle, and the respective Venturi tube is held in position in the bore of the tube plate by the central plate with said ring interposed. As a result, the means which hold the nozzle can also be removed in a simple manner. In a desirable arrangement, the ring has on its outside a peripheral annular groove, and a passage extends from said groove to the nozzle. The tube plate is formed in the spaces between the receiving bores with transverse bores, which connect the annular spaces formed by the ring grooves with each other, and the tube plate has at least one transverse bore which extends through the tubular housing and opens into an annular space formed by the annular groove. A pressure conduit for the water to be supplied to the nozzles is connected to the latter transverse bore. The means for holding the nozzle consist suitably of a bracket, which bridges the inlet opening of the Venturi tube and carries a centrally disposed nozzle and is connected to and preferably integral with the ring that is inserted in the bore in the tube plate. The bracket has an internal bore which extends from the annular groove to the nozzle for supplying water thereto. As a result, all annular grooves can be supplied with water under pressure from a single pressure conduit with water which flows to the nozzles under pressure through the bores of the brackets bridging the inlet openings of the Venturi tubes.

The dust particles suspended in the air are precipitated by the water which has been sprayed in through the nozzles, and the sludge-containing water which is laden with dust is discharged. It is known to purify such sludge-containing water by causing the sludge to settle and to recycle the substantially purified water to the nozzles. This results in a lower water consumption and in the additional advantage that only the sludge must be discarded so that the environment of the dust collector is not contaminated by the sludge containing water. In the known arrangement, the sludge which contains the dust particles is separated from the water by means of hydrocyclones, which are subject to malfunction, particularly because their outlet valve is frequently clogged. When a hydrocyclone has failed because its outlet valve is clogged, time is required to repair the hydrocyclone, and in case of a failure of such dust collector installed in a mine, the work in the mine must be interrupted, too, because the dust loading in the air would otherwise exceed a tolerable degree. For this reason, the known apparatus had to be provided with a plurality of hydrocyclones so that another hydrocyclone can be started in case of a failure of a hydrocyclone.

In the equipment according to the invention, in which the Venturi tubes are inserted in a tubular housing, which is jacketed by the water tank, the sludge can be separated from the sludge-containing water in a simple manner. In another preferred embodiment of the invention, the tubular housing, in which the Venturi tubes are inserted, is surrounded throughout its periphery by the water tank, which is spaced around the housing, the space between the outer wall of the water tank and the tubular housing is divided by a partition, and a conduit for supplying sludge-containing water, which is laden with dust particles, opens into the water tank on one side of that partition. A conduit for supplying the water to the nozzles and a fresh-water conduit are connected to the water tank on the other side of said partition, and the compartments on both sides of the partition are connected by an overflow opening, and a multi-baffle separator for collecting the sludge is provided between the point where the sludge-containing water enters the water tank and the overflow opening. Such multi-baffle separator is not subject to malfunction. The sludge-containing water flows between the baffles, where the sludge is separated and permitted to settle, whereby the water is purified to such a degree that it can be recycled to the nozzles without hesitation, and the thus purified water flows through the overflow to the other side of the partition. To compensate for the removal of the water which is still contained in the collected sludge, make-up water is supplied through the fresh-water conduit. It is apparent that sludge is removed from the water on one side of the overflow and the water which is to be recycled to the nozzles is disposed on the other side.

In this way the water jacket between the tubular housing and the tank wall can be utilized for the removal of sludge.

In a preferred embodiment of the invention, the partition extends approximately horizontally in the upper portion of the water tank and a multi-baffle separator is disposed below the partition on each side of the tubular housing in the compartment for the sludge-containing water. In this arrangement a large space is available for the accommodation of the multi-baffle separators and an effective separation of the solid particles from the sludge-containing water is made possible. Because the compartment for the sludge-containing water and the compartment for pure water are respectively disposed below and above the partition, the separation of the solid particles is promoted by the fact that the sludge-containing water has a higher specific gravity than the pure water. Two multi-baffle separators disposed on opposite sides of the tubular housing are also more effective because more baffles can be accommodated.

In a preferred arrangement according to the invention, the conduit for the sludge-containing water opens into the water tank above the tubular housing, preferably approximately over the center thereof, and the space into which the conduit for sludge-containing water opens is separated by downwardly extending walls from the spaces in which the two multi-baffle separators are accommodated, and said walls are spaced apart from the tubular housing. In this arrangement, the sludge-containing water first flows downwardly over a large distance between the tubular housing and the downwardly extending walls and only thereafter rises through the multi-baffle separator. This promotes the separation in the lower portion of the compartment for the sludge-containing water so that the overall efficiency of the separation is increased. The arrangement is preferably such that the downwardly extending walls extend in the direction of the axis of the tubular housing and converge upwardly in the shape of a roof to the outlet of the conduit for the sludge-containing water. The walls which converge upwardly in the shape of a roof are suitable adjoined by vertically depending walls and the smallest distance from the latter walls to the tubular housing is approximately as large as the smallest distance between the tubular housing and the walls which converge upwardly in the shape of a roof. This arrangement results in the provision of relatively long downwardly extending passages which are disposed on both sides of the tubular housing and in which the sludge-containing water flows downwardly so that the efficiency of separation is further improved.

In a desirable embodiment of the invention, the baffles of the multi-baffle separators extend transversely to the axis of the tubular housing and are upwardly inclined. Because the tubular housing which receives the Venturi tubes is larger in length than in width and the width of the equipment is limited by the space available in the mine whereas the length of the equipment is less restricted, this arrangement permits an accommodation of a large number of long baffles and the passages provided between the baffles for the flow of sludge-containing water may be relatively long so that the efficiency of separation is much improved.

In a preferred arrangement according to the invention, a pure-water reservoir is formed in the water tank by an approximately vertical wall so as to be separate from the compartments for the sludge-containing water and the compartment for pure water, which are separated by the horizontal partition. The compartments which are separated by the horizontal partition are succeeded by said reservoir compartment in the direction of the axis of the tubular housing, and the fresh-water supply conduit opens into said pure-water reservoir. The pure-water reservoir communicates through at least one overflow opening in the vertical wall with the compartment for pure water disposed above the partition, and the pure-water conduit connected to the nozzles is connected to the pure-water reservoir. Because said pure-water reservoir communicates through overflow openings with the compartment for pure-water disposed above the partition, any solid particles still contained in the pure water may possibly settle between the compartment for pure water and the pure-water reservoir so that the pure water which is withdrawn from the pure water reservoir and supplied to the nozzle is of optimum purity.

In an alternative embodiment of the invention, the partition which divides the space between the outer wall of the water tank and the tubular housing may be approximately vertical and may extend below the tubular housing in the direction of the axis thereof, and the overflow opening is disposed above the tubular housing. In that case, the supply conduit for the sludge-containing water suitably opens into a downwardly extending passage, the cross-section of which extends throughout the length of the water tank, which extends longitudinally in the direction of the axis of the tubular housing. In this arrangement the conduit leading to the nozzles extends preferably from the lower part of that portion of the water tank which is disposed on that side of the tubular housing that is remote from the multi-baffle separator. The fresh-water conduit opens preferably into the upper part of said portion of the water tank so that the nozzles are supplied with a mixture of fresh water and water which has separated from the sludge and enters this portion of the water tank through the overflow at the top. The fresh-water conduit can suitably be shut off by a valve, which is controlled by a float in dependence on the water level in the water tank so that this level is maintained constant by the supply of fresh water.

Illustrative embodiments of the invention are diagrammatically shown on the drawing.

FIGS. 2, 3 and 4 show the Venturi tubes and the water jacket surrounding them, FIG. 2 being a sectional view taken on line II—II in FIG. 3, FIG. 3 an elevation taken in the direction of the arrow III in FIG. 2, and FIG. 4 is a sectional view taken on line IV—IV in FIG. 2.

FIG. 5 is a sectional view taken on the same plane as that of FIG. 2 and shows as a detail the inlet end of a Venturi tube which has been inserted into the end plate.

Figure 1:
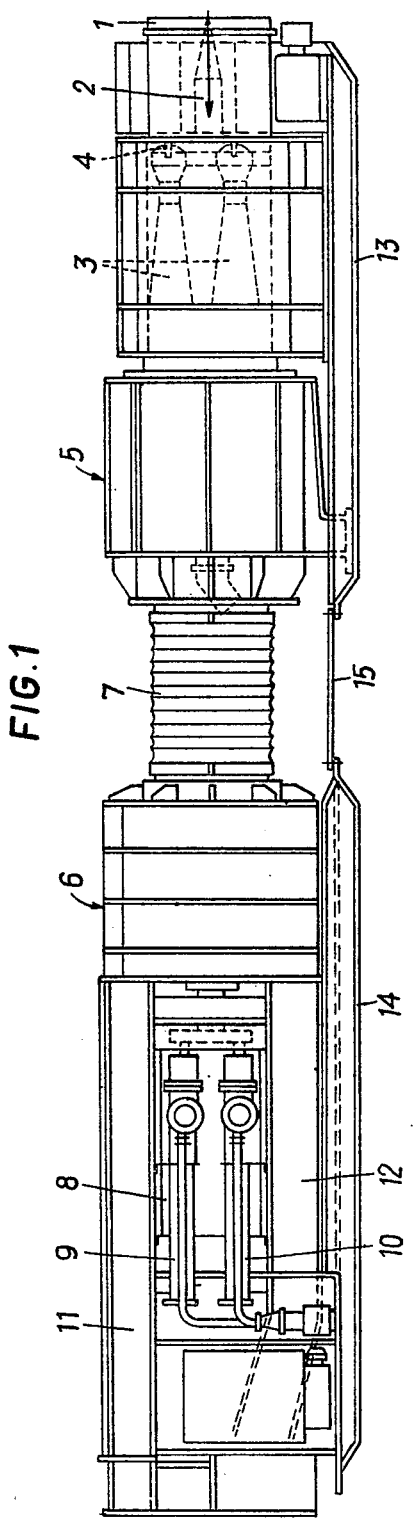
FIG. 1 is a side elevation showing the entire equipment.

In the overall arrangement shown in FIG. 1, numeral 1 designes the point where the air duct is connected through which air enters the equipment in the direction of arrow 2. The air flows through the Venturi tubes 3 in the direction of the arrow 2. Finely divided water is added through nozzles 4 in the tubes 3. A centifugal separator 5 is shown as well as a blower 6, which draws in the air and delivers it in the direction of the arrow 2. The blower 6 is connected to the centrifugal separator 5 by bellows 7 and is driven by a motor 8. A pump 9 supplies water to the nozzles 4. A pump 10 draws sludge from the housing of the centrifugal separator. The air which has been drawn by the blower 6 flows off the passages 11 and 12. The entire equipment rests on skids 13 and 14, which are pivoted to a rod 15 and on which the entire equipment can be pushed toward the working face as the working proceeds.

Figure 3:
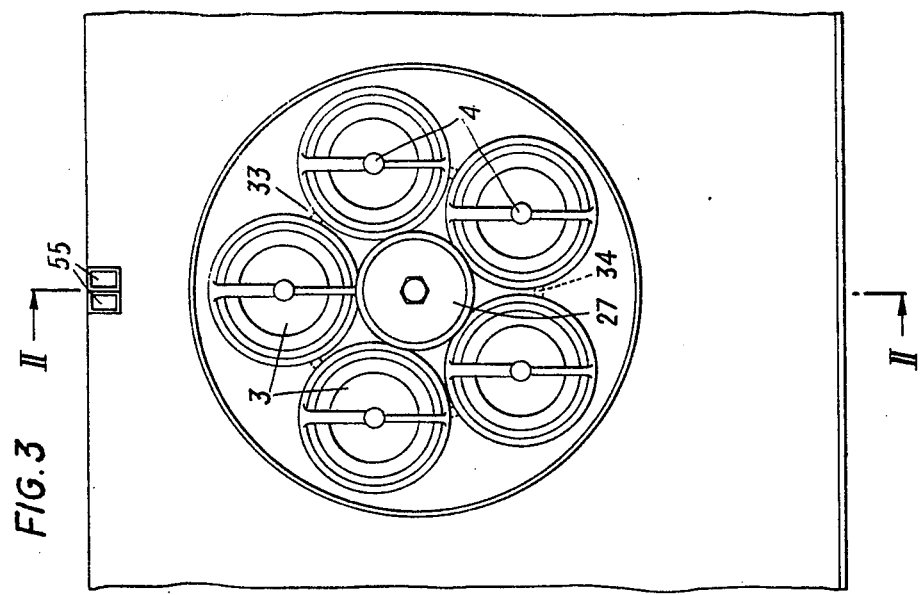
Figure 4:
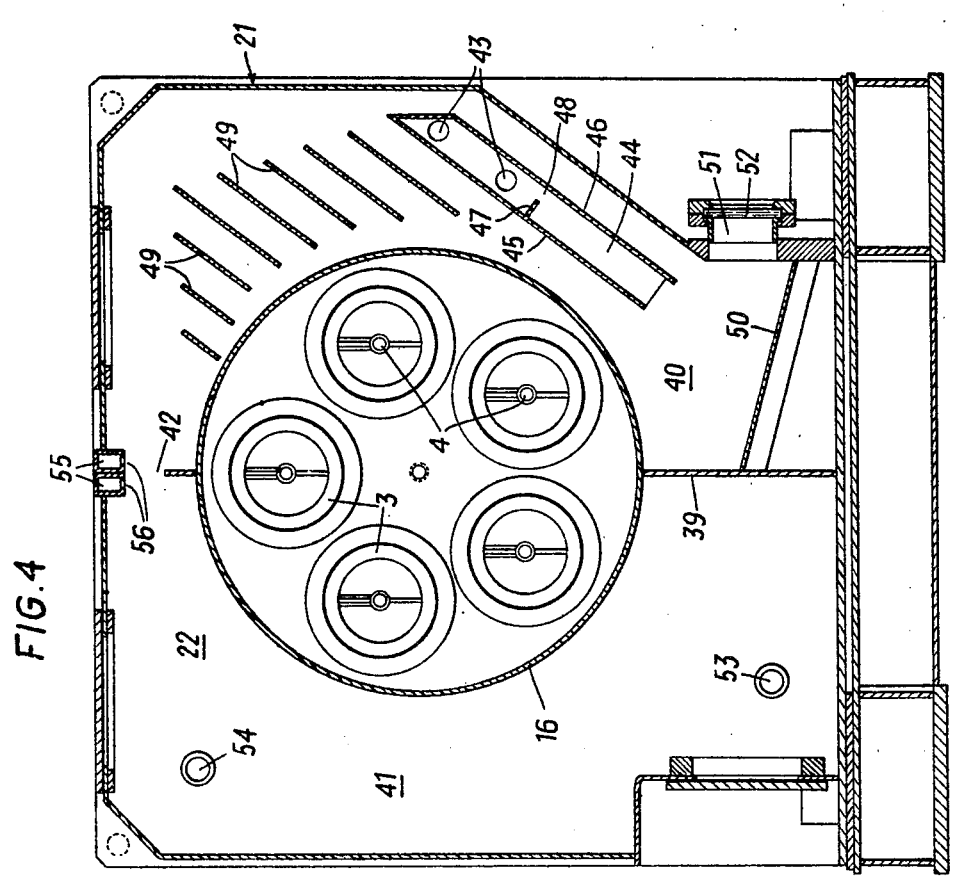

FIGS. 2, 3 and 4 are enlarged views showing the portion which comprises the Venturi tubes 3. Two tube plates 17 and 18 are welded into a tubular housing 16 and have receiving bores 19 and 20, in which five Venturi tubes 3 are inserted. The tubular housing 16 is surrounded by a water-filled tank 21 so that there is a water jacket 22 between the walls of the tank 21 and the tubular housing 16. The tank is divided by transverse walls 23 and 24. The water jacket 22 is disposed in the compartment between the transverse walls 23 and 24.

The inlet ends 25 of the Venturi tubes 3 and rings 26 are inserted in the receiving bores 19 of the tube plate 17. A central plate 27 overlaps the edges of the rings 26. A central plate 29 overlaps the edges of the outlet ends 28 of the Venturi tubes 3. The two central plates 27 and 29 are connected to the tube plates 17 and 18 by screws 30 and 31 so that the central plates 27 and 29 hold the Venturi tubes in position.

As is shown on an enlarged scale in FIG. 5, the rings 26 are formed on their outside surface with an annular groove 32. In the spaces 33 between the receiving bores 19, the tube plate 17 is formed with 34 which connect the annular spaces formed by the annular grooves 32 of the various rings 26. The annular space formed by the annular groove 32 of one of the rings 26 communicates through a bore 35 of the tube plate 17 with a fitting 36, from which water under pressure is to be supplied to the nozzles. Each ring 26 is provided with a bracket 37, which carries a central nozzle 4. The nozzles 4 are supplied with water under pressure from the annular spaces 32 through bores 38 provided in respective ones of the brackets 37.

The water tank 21 surrounds the tubular housing 16 throughout its periphery so that the tubular housing is entirely enclosed by the water tank. The space between the underside of the tubular housing 16 and the tank 21 is closed by a partition 39, which extends in the direction of the axis of the tubular housing and divides the water jacket 22 into two compartments 40 and 41, which communicate with one another through an overflow 42. Sludge-containing water is delivered by the sludge pump 10 through supply conduits 43 to a passage 44, which is defined by two metal plates 45 and 46, which adjoin the walls 23. As a result, the cross-section of the passage 44 extends throughout the length of the water tank between the walls 23 and 24. The water flows through this passage along a downwardly inclined path into the lower part of compartment 40. A transverse wall 47 having passage openings 48 is installed in the passage and serves to slow the flow.

The sludge-containing water which enters the lower part of the compartment 40 flows upwardly in the compartment 40 through a multi-baffle separator, which comprises baffles 49, which extend from the transverse wall 23 to the transverse wall 24. The walls 45 and 46 act as baffles, too. As the sludge-containing water flows between these baffles, the sludge separates from the water and in the lower part of the compartment 40 settles on an inclined bottom 50. The water, from which most of the sludge has been removed, flows through the overflow 42 into the compartment 41. A discharge opening 51 is provided with a cover, which has a sight glass 52. The pump 9 draws water from the compartment 41 through a conduit 53 and delivers the water via the fitting 36 to the nozzles 4.

Because water is discharged together with the sludge, the water from which the sludge has been removed is not sufficient for the supply of the nozzles. For this reason there is a fresh-water supply conduit 54 for compensating the water which has been lost. This fresh-water supply conduit may be connected to a water supply conduit and is controlled by a valve, not shown, which is controlled in turn by a float, not shown, too, in dependence on the water level in the tank 21.

Two square-section tubes 55 are installed in the top wall of the tank and are open at both ends and provided with bores 56. The water tank 21 is vented through the bores 56 and the tubes 55, which also stiffen the water tank 21.

Figure 6:
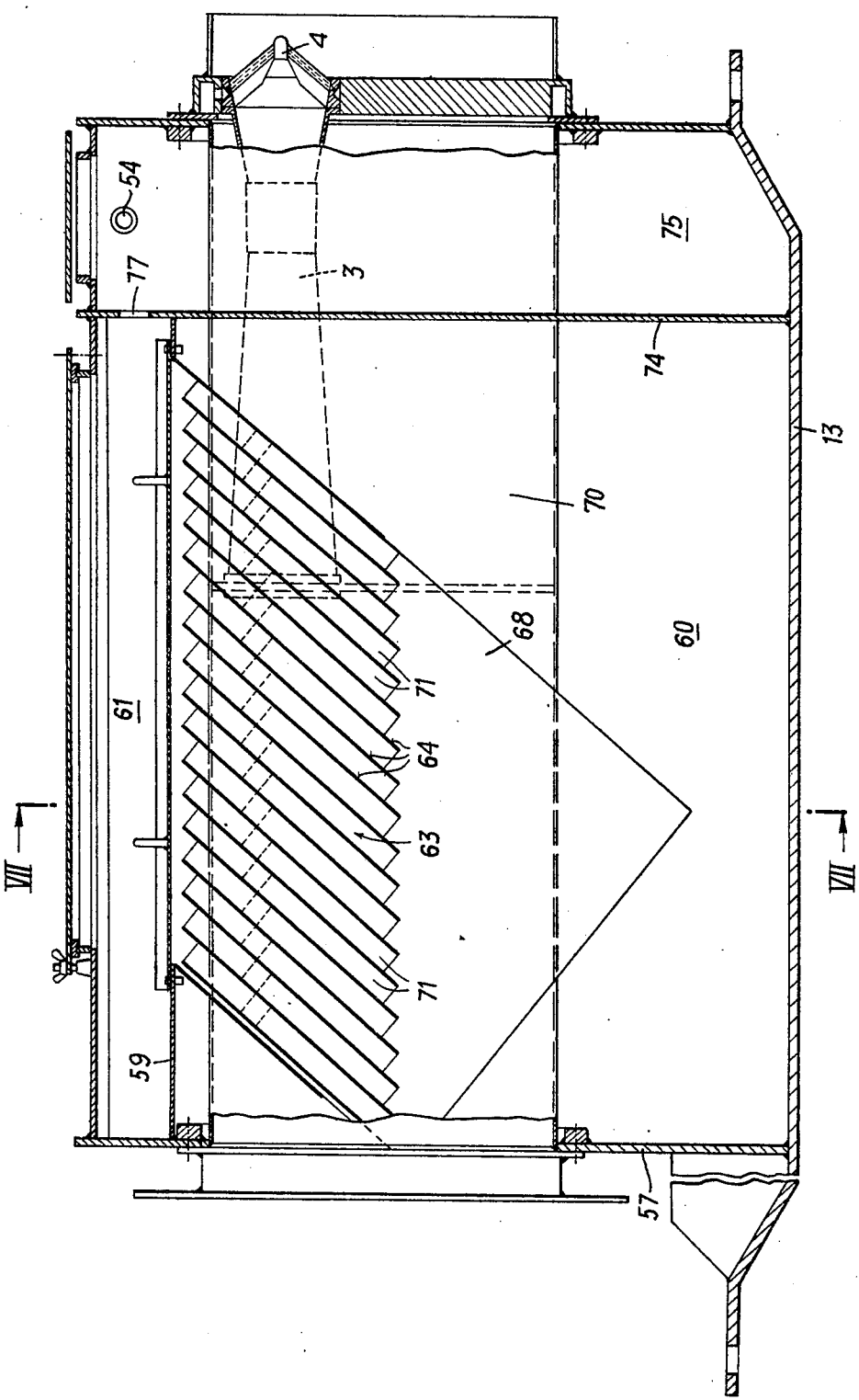
FIGS. 6 and 7 show a different embodiment of the water tank, FIG. 6 being a partial side elevation view and a partial sectional view taken on line VI—VI in FIG. 7, and FIG. 7 being a sectional view taken on line VII—VII in FIG. 6.
Figure 7:
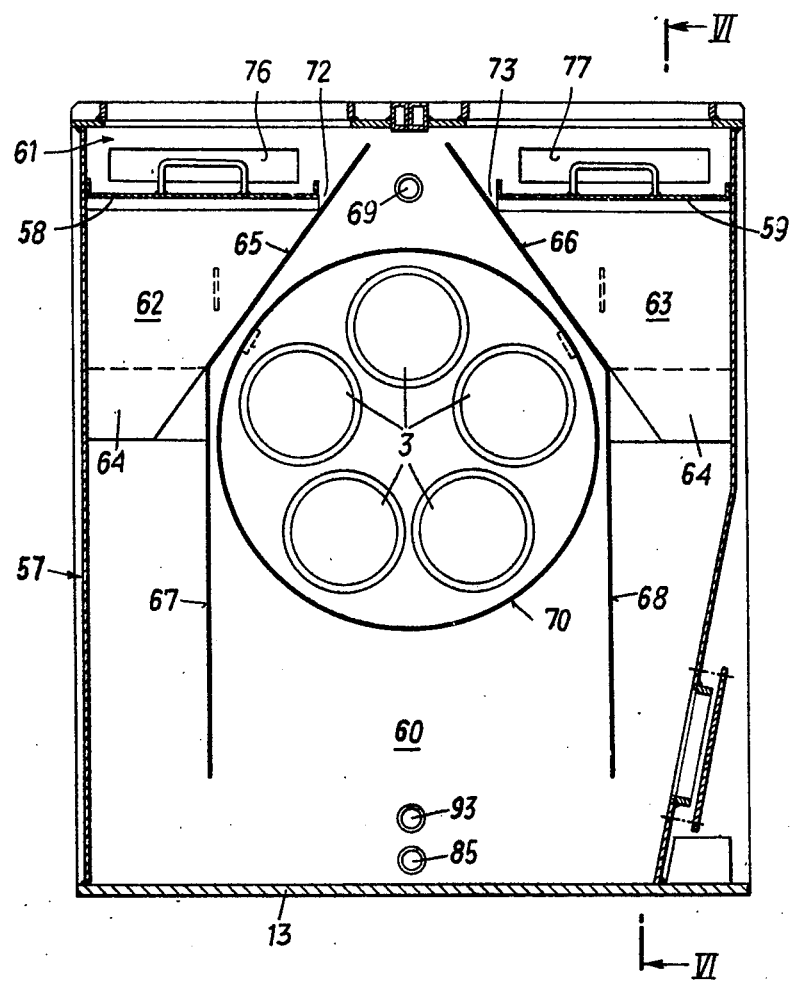

In the embodiment shown in FIGS. 6 and 7, the skid 13 is formed by the bottom of the water tank 57. This embodiment differs from the one shown in FIGS. 2 to 5 also in that the interior of the water tank 57 is divided by horizontal partitions 58 and 59 into a compartment 60 for sludge-containing water and a compartment 61 for fresh water. Two multi-baffle separators 62 and 63 are provided below the partitions 58 and 59 and consist of inclined baffles 64, which extend in the direction of the axis of the tubular housing. The multi-baffle separators 62 and 63 are limited by walls 65 and 66, which are downwardly inclined in the shape of a roof and which merge into vertical walls 67 and 68. The sludge-containing water is fed into the water tank through a fitting 69, which is centrally disposed with respect to the tubular housing 70 which surrounds the Venturi tubes. In the water tank, the sludge-containing water flows downwardly between the tubular housing and the walls 65,67 and 66,68, respectively, to the sludge-collecting compartment 60, in which the flow is reversed so that the sludge-containing water rises through the passages 71 between the baffles 64. The partitions 58 and 59 have passage openings 72 and 73, through which water from which the solids have been removed enters the compartment 61 for pure water.

A vertical wall 74 extends transversely to the axis of the tubular housing 60 and defines a pure-water reservoir 75, which axially succeeds the compartment 60 for sludge-containing water and the compartment 61 for pure water. The pure water flows into the pure-water reservoir 75 from the compartment 61 for pure water through slots 76 and 77 in the vertical wall 74.

Figure 8:
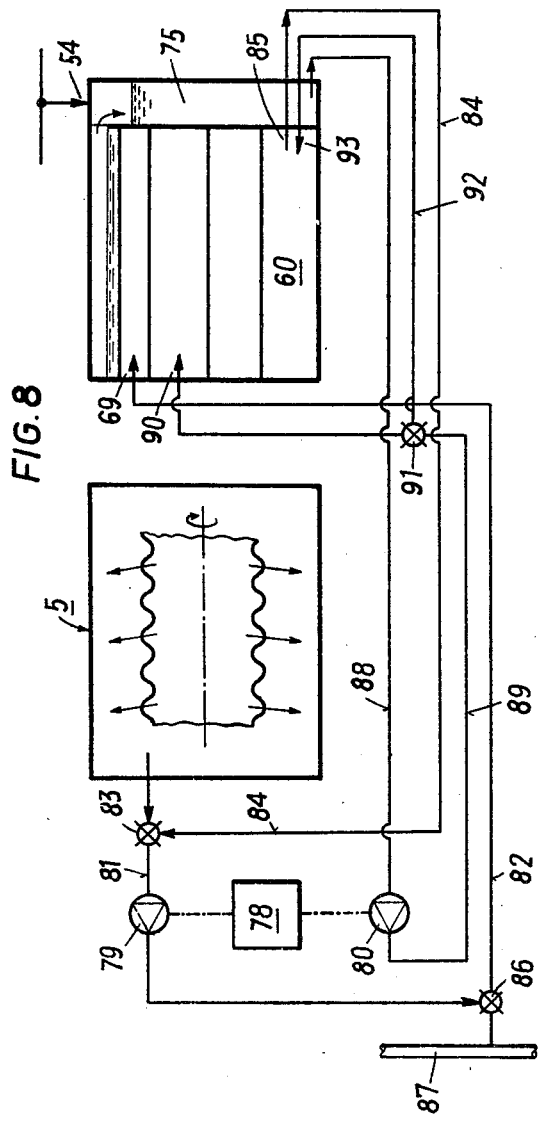
FIG. 8 is a diagrammatic view showing the water tank and the separator and the connecting conduits.

FIG. 8 is a diagram showing the overall system. A common motor 78 drives a pump 79 for sludge-containing water and a pump 80 for pure water. Sludge-containing water which becomes available in the separator 5 is drawn through a conduit 81 by the pump 79 and is delivered by said pump through conduit 82 to the inlet 69 of the compartment 60 for sludge-containing water. By means of a three-way valve 83, the pump 79 for sludge-containing water can be selectively connected to the separator 5 and to a sludge discharge conduit 84, which is connected at 85 to the compartment 60 for sludge-containing water. By means of a three-way plug valve 86 incorporated in the conduit 82, the latter can be connected to a rinsing line 87, which is provided in the mine and serves to remove sewage. In this arrangement one and the same pump 79 for sludge-containing water may be used to deliver sludge-containing water from the separator 5 to the compartment 60 for sludge-containing water and for discharging sludge from the compartment 60 for sludge-containing water through conduit 84 into the rinsing line 87 for discharge of sewage.

A conduit 88 is connected between the suction side of the pump 80 for pure water and the pure-water reservoir 75. Pure water is delivered to the nozzles 4 at 90 via a conduit 89. By means of a three-way plug valve 91 incorporated in conduit 89, the discharge side of the pump for pure water can be connected to a flushing conduit, which opens at 93 into the compartment 60 for sludge-containing water. In this way, the discharge of sludge from the compartment 60 for sludge-containing water can be facilitated. This will be particularly advantageous with sludges which harden in the presence of water, such as sludges which contain calcium carbonate and particularly calcium sulfate. In this arrangement the pump for circulating the pure water may be used to supply pure water to the nozzles and to inject pure water into the compartment for sludge-containing water. This is possible without difficulty because the compartment for sludge-containing water will usually be cleaned only during a standstill of the plant. A freshwater conduit 54 opens into the pure-water reservoir 75.

We claim:

1. In apparatus for removing dust particles from an air stream: a tubular housing having an air-receiving inlet end and an outlet end; a plurality of Venturi tubes having open inflow ends and open outflow ends; means supporting said Venturi tubes side-by-side within said tubular housing, with their axes parallel to the housing axis so that their inflow ends receive air flowing into the inlet end of said housing; nozzle means for spraying water into the air entering each of the Venturi tubes whereby dust particles in the air are collected in the water and whereby sludge-containing water and air are discharged through the outflow ends of said Venturi tubes; means forming a tank which surrounds said tubular housing, said means including an outer wall surrounding and spaced from said tubular housing and partition means in the space between said outer wall and said tubular housing dividing said space into first and second compartments; sludge separator means in communication with the outflow ends of said Venturi tubes; conduit means connected to said sludge separator means for supplying sludge-containing water from said separator means to said first compartment; means for discharging sludge from said first compartment; means for conveying essentially sludge-free water from said first compartment to said second compartment; freshwater supply means connected to said second compartment; and nozzle-supply conduit means connecting said second compartment and said nozzle means for supplying water thereto.

2. Apparatus as in claim 1 wherein said Venturi tubes are mounted in bores in two axially spaced apart tube plates which are disposed in said tubular housing at right angles to the axis of the latter.

3. Apparatus as in claim 2 wherein said bores in said tube plates are arranged in a circular pattern which is coaxial with said tubular housing, said apparatus further including a central plate connected to each of said tube plates and overlapping the end edges of said Venturi tubes so as to hold the Venturi tubes in position.

4. Apparatus as in claim 2 wherein said nozzle means includes for each Venturi tube a ring disposed in the respective bore of the tube plate at the inflow end of the Venturi tube, said ring having a peripheral annular groove in its outer circumference, a bracket bridging said inflow end of said Venturi tube and coupled to a nozzle which is centrally disposed relative to said inflow end, said bracket having a through bore connecting said annular groove with said nozzle for delivering water to said nozzle.

5. Apparatus as in claim 2 wherein said nozzle means includes for each Venturi tube a ring disposed in the respective bore of the tube plate at the inflow end of the Venturi tube and coupled to a nozzle, said ring having a peripheral annular groove in its outer circumference, means forming a passage extending from said groove to said nozzle, said tube plate having internal bores connecting the peripheral annular grooves together and a further internal bore which connects at least one of said grooves with said nozzle-supply conduit means.

6. Apparatus as in claim 5 wherein each of said rings includes an O-ring seal on each side of said peripheral annular groove.

7. Apparatus as in claim 2 wherein said tube plates are welded to said tubular housing.

8. Apparatus as in claim 2 wherein said tube plates are spaced from the ends of said tubular housing.

9. Apparatus as in claim 1 including a multi-baffle separator in said first compartment for separating sludge from water and wherein said means for conveying essentially sludge-free water from said first compartment to said second compartment is an overflow opening between said compartments for permitting flow of essentially sludge-free water into said second compartment.

10. Apparatus as in claim 1 wherein said partition means extends approximately horizontally in the upper portion of said tank and wherein a multi-baffle separator is disposed below the partition means on each side of said tubular housing in said first compartment.

11. Apparatus as in claim 1 wherein said conduit means for supplying sludge-containing water to said first compartment opens into said first compartment at a location above said tubular housing, said partition means including two downwardly extending walls each spaced from one side of said tubular housing and from said outer wall, and said apparatus including a multi-baffle separator between each downwardly extending wall and said outer wall.

12. Apparatus as in claim 11 wherein said downwardly extending walls also extend axially of said tubular housing and converge upwardly in the shape of a roof to the location where said sludge-containing water conduit means opens into said first compartment.

13. Apparatus as in claim 12 wherein the walls which converge upwardly in the shape of a roof are adjoined by vertically depending walls, and the smallest distance from the latter walls to said tubular housing is approximately as large as the smallest distance between said tubular housing and the walls which converge in the shape of a roof.

14. Apparatus as in claim 1 wherein said tubular housing is horizontally positioned and wherein said partition means is approximately vertical and extends below said tubular housing in the direction of the axis thereof, said means for conveying essentially sludge-free water from said first compartment to said second compartment being disposed above said tubular housing.

15. Apparatus as in claim 1 wherein said conduit means for supplying sludge-containing water to said first compartment opens into a downwardly directed passage the cross section of which extends throughout the length of said tank.

16. Apparatus as in claim 1 wherein said first compartment has an inclined bottom, said means for discharging sludge being located adjacent the lowermost part of said inclined bottom.

* * * * *